United States Patent
Desanti (10) Patent No.: US 9,871,864 B2
(45) Date of Patent: *Jan. 16, 2018

(54) FIBRE CHANNEL PEER ZONING

(71) Applicant: Cisco Technology, Inc., San Jose, CA (US)

(72) Inventor: Claudio Desanti, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,061

(22) Filed: Oct. 28, 2016

(65) Prior Publication Data
US 2017/0048322 A1    Feb. 16, 2017

Related U.S. Application Data

(63) Continuation of application No. 13/313,108, filed on Dec. 7, 2011, now Pat. No. 9,565,050.

(51) Int. Cl.
| | |
|---|---|
| *G06F 15/173* | (2006.01) |
| *H04L 29/08* | (2006.01) |
| *H04L 29/06* | (2006.01) |
| *G06F 3/06* | (2006.01) |
| *H04L 12/24* | (2006.01) |
| *H04L 12/931* | (2013.01) |

(52) U.S. Cl.
CPC ............ *H04L 67/1097* (2013.01); *G06F 3/06* (2013.01); *H04L 29/06* (2013.01); *H04L 41/00* (2013.01); *H04L 49/00* (2013.01); *H04L 67/1044* (2013.01)

(58) Field of Classification Search
CPC ..... H04L 67/1097; H04L 29/06; H04L 41/00; G06F 3/06
USPC ........................................................ 709/223
See application file for complete search history.

(56) References Cited

U.S. PATENT DOCUMENTS

| | | | |
|---|---|---|---|
| 7,656,884 B1 * | 2/2010 | DeSanti ................ | H04L 41/082 370/360 |
| 2006/0190611 A1 * | 8/2006 | Miyazaki .............. | G06F 3/0605 709/229 |
| 2009/0037977 A1 * | 2/2009 | Gai ....................... | H04L 63/101 726/1 |

(Continued)

OTHER PUBLICATIONS

American National Standard for Information Technology, "Fibre Channel—Generic Services-6 (FC-GS-6)," New York, NY, Jul. 22, 2009.

(Continued)

*Primary Examiner* — Alan S Chou
(74) *Attorney, Agent, or Firm* — Edell, Shapiro & Finnan, LLC (57) ABSTRACT

Techniques are provided for the creation of a peer zone definition for use in a Fibre Channel (FC) Fabric. The peer zone definition defines a peer zone in which two or more initiator host devices are each permitted to communicate with a target device, but the two or more initiator host devices are prevented from communicating with each other. In accordance with one example, a target device and of two or more initiator host devices connected to the FC Fabric are received. A peer zone definition is created, and the peer zone definition is transmitted to the switches composing the FC Fabric for enforcement.

20 Claims, 12 Drawing Sheets

(56) References Cited

U.S. PATENT DOCUMENTS

2010/0306348 A1* 12/2010 Dieberger ............. G06F 3/0605
                     709/220

OTHER PUBLICATIONS

American National Standard for Information Technology, "Fibre Channel—Switch Fabric-5 (FC-SW-5)," New York, NY, Jun. 3, 2009.

* cited by examiner

AAPZ REQUEST COMMAND — 190

| CT_IU PREAMBLE |
| --- |
| ZONE NAME |
| NUMBER OF ZONE ATTRIBUTE ENTRIES (K) |
| ZONE ATTRIBUTE ENTRY #1 |
| ZONE ATTRIBUTE ENTRY #2 |
| ... |
| ZONE ATTRIBUTE ENTRY #K |
| NUMBER OF ZONE MEMBERS (M) |
| ZONE MEMBER #1 |
| ZONE MEMBER #2 |
| ... |
| ZONE MEMBER #M |

ACCEPTANCE OF GAPZ REQUEST

| CT_IU PREAMBLE |
|---|
| ZONE NAME |
| NUMBER OF ZONE ATTRIBUTE ENTRIES (K) |
| ZONE ATTRIBUTE ENTRY #1 |
| ZONE ATTRIBUTE ENTRY #2 |
| ... |
| ZONE ATTRIBUTE ENTRY #K |
| NUMBER OF ZONE MEMBERS (M) |
| ZONE MEMBER #1 |
| ZONE MEMBER #2 |
| ... |
| ZONE MEMBER #M |

FIBRE CHANNEL PEER ZONING

CROSS-REFERENCE TO RELATED APPLICATIONS

This application is a continuation of U.S. patent application Ser. No. 13/313,108 entitled "Fibre Channel Peer Zoning," filed Dec. 7, 2011, the content of which is hereby incorporated by reference herein.

TECHNICAL FIELD

The present disclosure relates generally to zoning in Fibre Channel networks.

BACKGROUND

Fibre Channel (FC) is a high-speed network technology and protocol suite used to implement storage area networks (SAN). A purpose of the FC protocol suite is to efficiently manage large numbers of storage devices using serial interfaces operating over optical or electrical interfaces. FC provides an efficient and dependable means for transferring data between workstations, mainframes, supercomputers, desktop computers, and storage devices.

Recent developments have extended Fibre Channel to Ethernet. Fibre Channel over Ethernet (FCoE) is a protocol that leverages Ethernet extensions to enable the establishment of lossless connections between two Ethernet nodes. The FCoE protocol uses such lossless connections. More specifically, native FC frames are encapsulated in Ethernet frames such that Ethernet becomes the physical interface and FC becomes the transport protocol. At an Ethernet receiving node, the native FC frames are de-encapsulated from the Ethernet frames and then processed in accordance with the FC protocol. By deploying the lossless capability in Ethernet, FC can be extended to Ethernet-capable network devices; thereby increasing the reach of FC connected devices. As such, FC networks may use native FC or FCoE as the underlying transport protocol.

A storage area network (SAN) is used to connect host devices (e.g., servers, computers, etc.) to one or more shared storage devices. The network part of a SAN based on Fibre Channel is called FC switched fabric. A switched fabric comprises one or more FC switches that are deployed to direct traffic between the host devices and the storage devices. The host devices perform computations and/or provide services, usually through a network connection to a wide area network (WAN) (e.g., the Internet, Intranet, etc.) or a local area network (LAN).

DESCRIPTION OF EXAMPLE EMBODIMENTS

Overview

Techniques are provided for the creation of a peer zone definition for use in a Fibre Channel (FC) Fabric. The peer zone definition defines a peer zone in which two or more initiator host devices are each permitted to communicate with a target device, but the two or more initiator host devices are prevented from communicating with each other. In accordance with one example, a target device and two or more initiator host devices connected to the FC Fabric are received. A peer zone definition is created, and the peer zone definition is transmitted to the switches composing the FC Fabric for enforcement.

Example Embodiments

Figure 1:
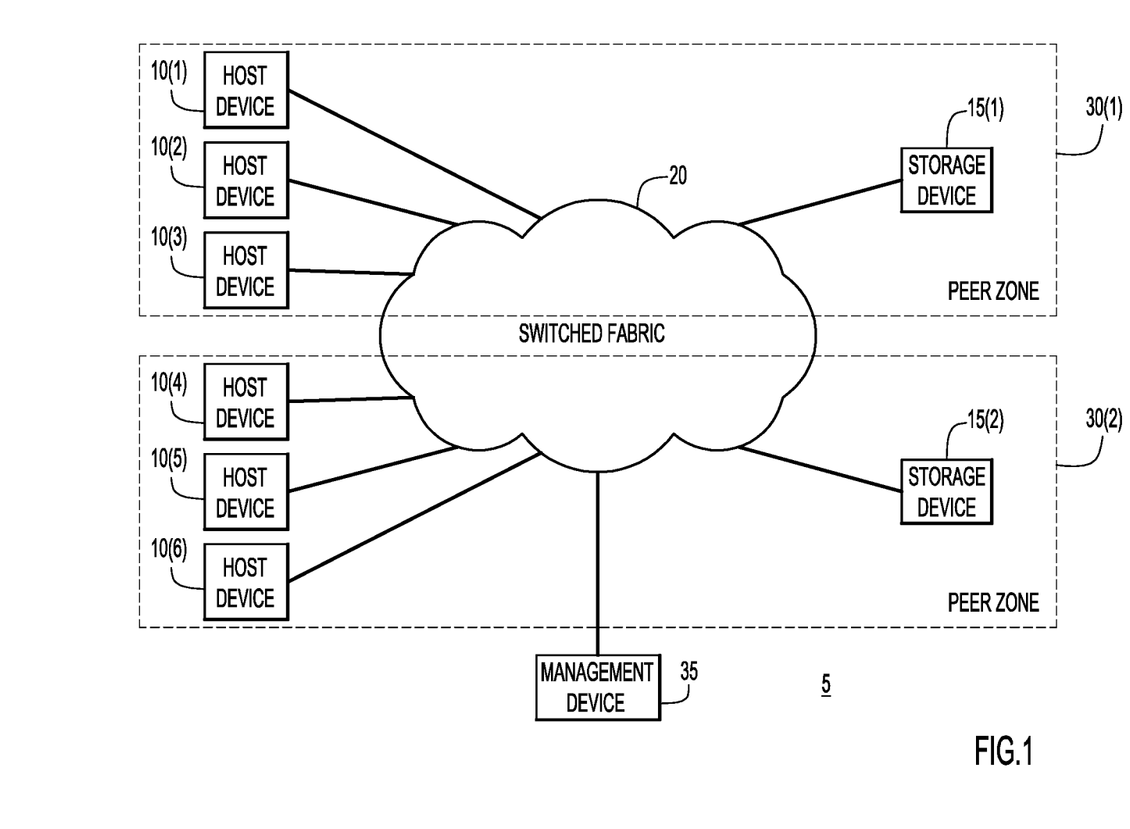
FIG. 1 is a block diagram of a storage area network (SAN) implemented in accordance with peer zoning techniques described herein.

FIG. 1 is a block diagram of an example FC storage area network (SAN) that is generally shown at reference numeral 5. FC SAN 5 may use native FC or FCoE as the underlying transport protocol. For ease of illustration, examples will be described herein with reference to native FC as the transport protocol.

In the example of FIG. 1, FC SAN 5 comprises a plurality of host devices 10(1)-10(6) and two or more storage devices 15(1) and 15(2), connected by an FC switched fabric (simply FC Fabric) schematically represented by cloud 20. FC Fabric 20 comprises a plurality of switches (not shown in FIG. 1). Host devices 10(1)-10(6) are also referred to as "initiators" because they initiate read or write transactions with the storage devices 15(1) and 15(2), and storage devices 15(1) and 15(2) are also referred to as "targets" because they receive the commands sent from the host devices. Connected to FC Fabric 20 is a management device 35 which, as described below, may be a dedicated management console or a storage device.

In certain circumstances, FC SAN 5 may be partitioned into smaller subsets or groups in order to, for example, restrict communication, add security, and to simplify management. This partitioning of FC SAN 5 is referred to herein as FC zoning, or simply zoning. Zoning is enforced by FC Fabric 20. A conventional "zone" is a list of nodes (initiators and targets) that are allowed to communicate with each other. In conventional zoning, a zone comprises a storage device (target) that is shared among multiple host devices (initiators). According to conventional zoning, all devices within the zone can communicate with one another. That is, host devices within the zone can communicate with the storage device as well as with each of the other host devices in the zone (i.e., host device to host device communications are allowed).

In an FC SAN, when a node (initiator or target) is connected to a Fabric, the node acquires an address identifier (N_Port_ID) in order to communicate. The N_Port_ID is acquired through a Fabric Logic (FLOGI) procedure, as known in the art. As such, when a Fabric, such as FC Fabric 20, is operational, each node has an address (N_Port_ID) that is used to communicate. In operation, initiator and target devices in an FC SAN communicate through the exchange of FC (or FCoE) frames. A frame is transmitted from a source address identifier (i.e., an N_Port_ID referred to as S_ID) to the destination address identifier (i.e., an N_Port_ID referred to as D_ID). These source and destination address identifiers are carried in the header of the frame.

FC switches generally enforce zoning while delivering frames through a simple rule in which, if a frame has an S_ID and D_ID belonging to nodes that are part of at least one zone in the enforced zoning definition (called active Zone Set), then the frame is delivered, otherwise it is discarded (i.e., communication among zone members is allowed, any other communication is not allowed).

It has been determined that a zoning arrangement in which N host devices can only communicate with the storage device, and not with one another, may be beneficial. However, expressing this type of access control with conventional zoning schemes requires the definition of N zones in which each of the N zones includes one initiator and one target. That is, because conventional zoning allows all devices within a zone to communicate with one another, to prevent host device to host device communication each zone has to have only two members: a single initiator and the target. This potentially results in the creation of a large number of different zones, thereby adding management complexities. As such, conventional zoning is seen by some as too burdensome in automated storage provisioning environments.

Accordingly, zoning techniques are provided herein in which host device to host device communications are prevented without the need for a large number of two-member zones. This is enabled through the use of a "peer zone definition" that defines a "peer zone" in which two or more host devices (initiators) are within a single zone definition and are each permitted to communicate with a storage device (target). However, within the peer zone, the two or more initiator host devices are prevented from communicating with each other. The peer zone definition is a type of data structure that indicates to FC Fabric 20 that the zone is a peer zone, and that provides the characteristics of the peer zone.

In a FC Fabric, zones are grouped in Zone Sets, maintained by the FC Fabric, and, at any time, one of the Zone Sets is the one enforced by the Fabric. The Zone Set currently enforced by the Fabric is called active Zone Set and the other Zone Sets are collectively referred to as a Zone Set database.

Figure 2:
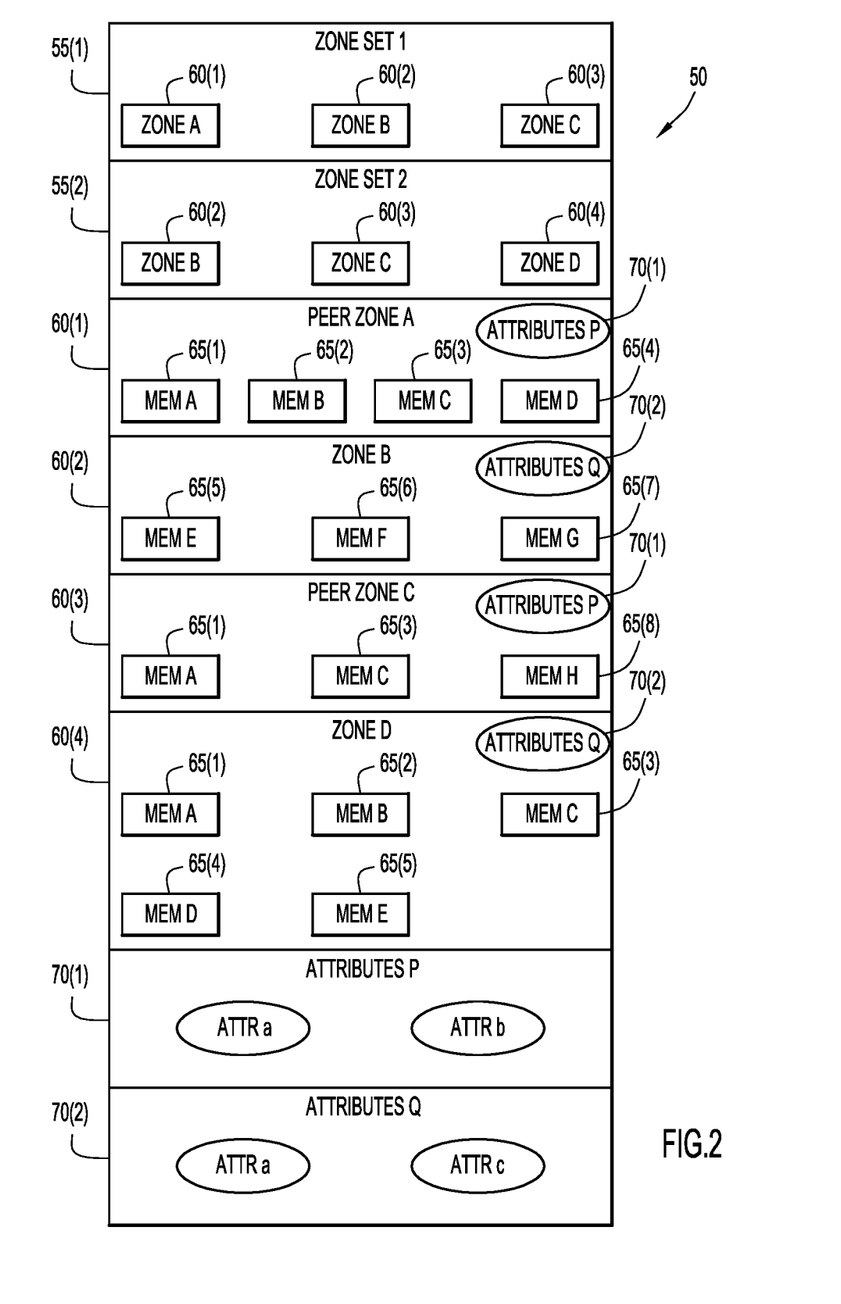
FIG. 2 is a schematic diagram of a zone set database.

FIG. 2 is a schematic diagram illustrating the logical structure of an example Zone Set database 50. Zone Set Database 50 comprises a first Zone Set 55(1) and a second Zone Set 55(2). Each Zone Set 55(1) and 55(2) is identified by a Zone Set name and contains a list of references to zone definitions 60(1), 60(2), 60(3), and 60(4). Zone definitions 60(1) and 60(3) may be conventional zone definitions or peer zone definitions.

Each zone definition 60(1)-60(4) is identified by a zone name and includes a list of zone members. For example, zone definition 60(1) includes members 65(1)-65(4), zone definition 60(2) includes members 65(5)-65(7), zone definition 60(3) includes members 65(1), 65(3), and 65(8), and zone definition 60(4) includes members 60(1)-60(6). A zone definition may also include a reference to a zone attribute object, defining a list of attributes that can be associated with the zone and that can modify the zone enforcement rules. Zone definitions 60(1) and 60(3) each include attribute object 70(1), while zone definitions 60(2) and 60(4) each include attribute object 70(2).

Figure 3:
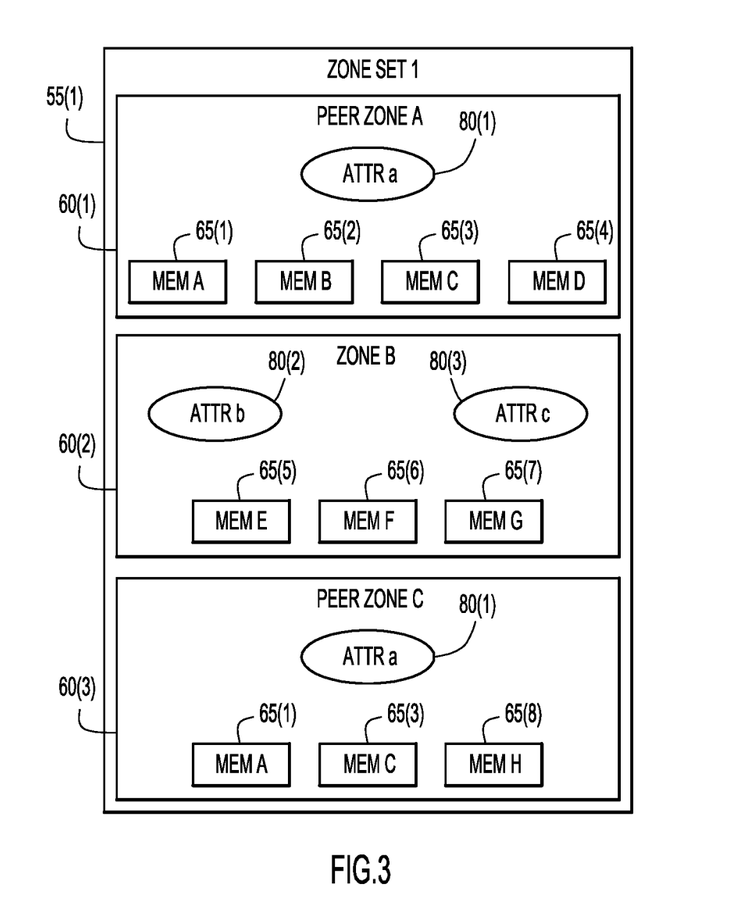
FIG. 3 is a schematic diagram of an active zone set that includes a peer zone.

FIG. 3 shows the logical structure of the active Zone Set 55(1) of FIG. 2. As shown, the active Zone Set is a set of defined zones 60(1)-60(3), each identified by a zone name. Each zone definition includes a list of zone members and may include one or more zone attributes. Zone definitions 60(1) and 60(3) each includes a zone attribute 80(1), referred to as a peer zone attribute (described in more detail below), and zone definition 60(2) includes two zone attributes 80(2) and 80(3).

Zone attributes are used to specify additional characteristic of a zone that provide additional behaviors in addition to the fundamental one described above. Zone attributes may provide additional parameters. Current FC standards define four zone attributes: protocol attribute, used to restrict the zone to a certain protocol (specified as a parameter of the attribute), hard zone attribute, used to specify frame by frame enforcement (without parameter), broadcast zone attribute, used to specify additional constraints on broadcast frames processing (without parameter), and Inter-Fabric zone (IFR) zone, used to identify an Inter-Fabric zone (without parameter).

A peer zone is defined through the definition of a new zone attribute, a peer zone attribute. The peer zone definition identifies a principal member (i.e., the target storage device), specified as a parameter of the peer zone attribute, and a list of peer members (i.e., initiator host devices) as zone members. As noted above, the fundamental property of a peer zone is that peer members are allowed to communicate with the principal member, and the peer members are not allowed to communicate among themselves (unless allowed by other zones in the active zone set).

Referring back to FIG. 1, this figure schematically illustrates two peer zones 30(1) and 30(2). Peer zone 30(1) includes host devices 10(1)-10(3), as well as storage device 15(1). As such, in this arrangement, each of host devices 10(1)-10(3) may communicate with storage device 15(1) (i.e., each of the host devices may initiate read or write transactions with the storage devices 15(1)), but host devices 10(1)-10(3) are prevented from communicating with one another.

Peer zone 30(2) includes host devices 10(4)-10(6), as well as storage device 15(2). Similar to peer zone 30(1), in this arrangement, each of host devices 10(4)-10(6) may communicate with storage device 15(2) (i.e., each of the host devices may initiate read or write transactions with the storage devices 15(2)), but host devices 10(4)-10(6) are prevented from communicating with one another.

Similar to other zones, peer zones are identified by a zone name. In certain environments, such as automated storage provisioning environments, specifying a zone name (i.e., by an administrator) may be not be possible nor acceptable. In these situations, a default peer zone name may be algorithmically computed from the N_Port_Name of the Principal member (i.e., target device) in a zone. The algorithmically computed name could be, for example, 'X0_YYYYYYYYYYYYYYYY', where YYYYYYYYYYYYYYYY is the American Standard Code for Information Interchange (ASCII) encoding of the hexadecimal representation of the Principal N_Port_Name.

Figure 4:
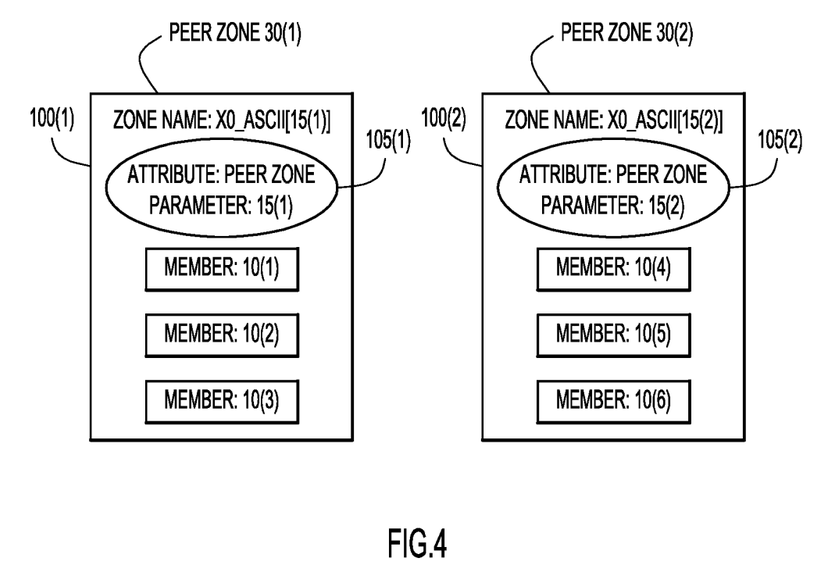
FIG. 4 is a schematic diagram of two peer zones implemented in FIG. 1.

FIG. 4 shows an example of definitions 100(1) and 100(2) for peer zones 30(1) and 30(2), respectively, of FIG. 1. As shown, the zone name is defined as specified above, the peer zone attributes 105(1) and 105(2) define the principal member (target), and the zone members are the peer members (initiators) that may communicate with the target, but not with one another.

Management of zoning configurations in an FC Fabric is usually performed through a management function provided by each Fibre Channel switch. This management function is referred to as the Fabric Zone Server. This function can be accessed through a protocol called Common Transport (CT). Using this protocol a management station (which is just another FC node) is able to access the Fabric Zone Server through a set of commands in order to define and manage zones. Basically, when a host sends a frame to the management service well known address, that frame is processed by the switch directly connected to the host in order to provide the abstraction of a Fabric service. For the Fabric Zone Server, that switch also performs some Fabric actions (i.e., switch to switch communications) to ensure that every other switch of the Fabric has the same information (i.e., the same zone definition), in order to ensure consistent fabric behavior. To enable this consistent zone information distribution, in conventional arrangements, write access to the Fabric zone server (i.e., a modification to the Zones definition) happens inside a Fabric Zone Server session, that includes, for example, locking the Fabric through a Server Session Begin (SSB) command (i.e., a Fabric lock operation), modifying a local copy of a desired zoning configuration (e.g., add zone, remove zone, add zone member, remove zone member, etc.), making the modified zoning configuration the Fabric Zoning configuration through a Commit (CMIT) command, and releasing the lock through a Server Session End (SSE) command (i.e., a Fabric unlocking operation).

This interface may be suited for zoning management through a management station, but may be problematic in certain automated storage provisioning environments. As such, in order to facilitate use in such automated storage provisioning environments, techniques described herein provide a simpler and selectively more restrictive way to access the Fabric Zone Server in order to define, modify, and delete peer zones.

This simpler way to access the Fabric Zone Server is enabled through the definition of three new commands, providing the function of adding (or updating) a peer zone to the active Zone Set, referred to as the Add/update Active Peer Zone (AAPZ) command, the function of removing a peer zone from the active Zone Set, referred to as the Remove Active Peer Zone (RAPZ) command, and the function of reading the definition of a peer zone from the active Zone Set, referred to as the Get Active Peer Zone (GAPZ) command. These commands are restricted in the sense that they manage only peer zone definitions and act only on the active Zone Set, because management of the Zone Set database has in any case to be performed by a storage administrator. By using these new commands, in accordance with certain circumstances, a storage device can define and manage its own peer zones. In fact, the storage device (e.g., storage device 15(1) of FIG. 1) should be configured to define which initiators can access which parts of the storage space. From this information, the storage device can define its peer zone configuration, using the algorithmically computed name as zone name, and provide it to the Fabric for enforcement through these new Fabric Zone Server commands.

Figure 5:
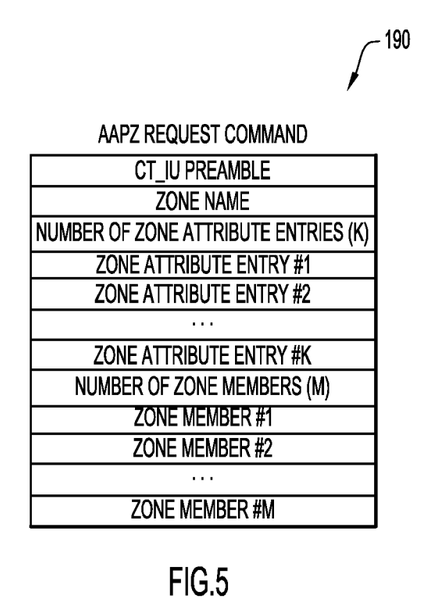
FIG. 5 is a table illustrating an example Add/Update Active Peer Zone (AAPZ) request.
Figure 6:
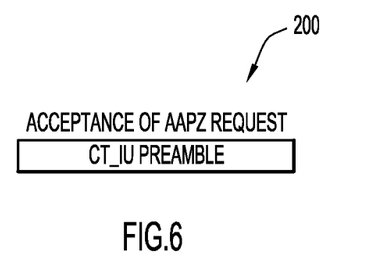
FIG. 6 is a table illustrating an example acceptance of the AAPZ request.

Table 190 of FIG. 5 shows the content of the AAPZ Request. As with any Common Transport command, the first item is the CT_IU Preamble. The AAPZ Request also carries the name of the peer zone being defined, followed by its definition (i.e., a number of zone attributes and a number of zone members). By virtue of being a peer zone, one of the zone is a peer zone attribute, and in many cases it will be the only attribute in the zone specification. Upon receiving the AAPZ Request, the Fabric Zone server responds with an acceptance of the command, whose content is shown in table 200 of FIG. 6.

The activation in the FC Fabric of the peer zone received with an AAPZ Request requires a lock of the Fabric. The Fabric Zone server can delay this activation by a certain timeout period (e.g., one minute). The purpose of this delay is to enable the Fabric Zone server to collect multiple AAPZ and RAPZ requests and process them all together inside a single fabric lock. When the activation of the peer zone is performed, if the active zone set does not include a peer zone with the zone name specified in the command, the update includes adding the specified peer zone to the active zone set. If the active zone set includes a peer zone with the specified zone name (i.e., the peer zone identified in the AAPZ is currently a zone in the active zone set), the update includes replacing the peer zone with the received peer zone definition.

Figure 7:
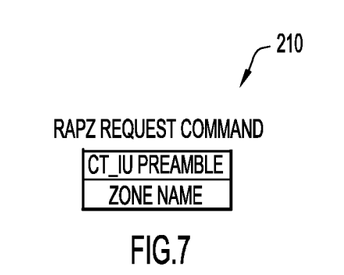
FIG. 7 is a table illustrating an example Remove Active Peer Zone (RAPZ) request.
Figure 8:
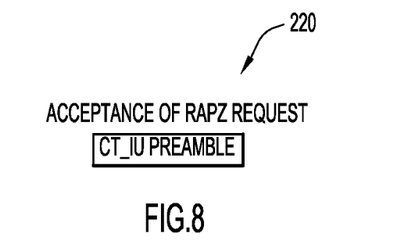
FIG. 8 is a table illustrating an example acceptance of the RAPZ request.

Table 210 of FIG. 7 shows the content of the RAPZ Request. As any Common Transport command, the first item is the CT_IU Preamble. The RAPZ Request also carries the name of the peer zone to be removed. Upon receiving the RAPZ Request, the Fabric Zone server will attempt to update the active zone set to remove the identified peer zone. If the active zone set does not contain any peer zone having the specified zone name, then the RAPZ request is rejected. If the active zone set contains a peer zone having the specified zone name, then the Fabric Zone server responds with an acceptance of the command, whose content is shown in table 220 of FIG. 8.

The removal from the active zone set of the peer zone received with a RAPZ Request requires a lock of the Fabric. The Fabric Zone server can delay this processing by a certain timeout period (e.g., one minute). The purpose of this delay is to enable the Fabric Zone server to collect multiple RAPZ and AAPZ requests and process them all together inside a single fabric lock.

Figure 9:
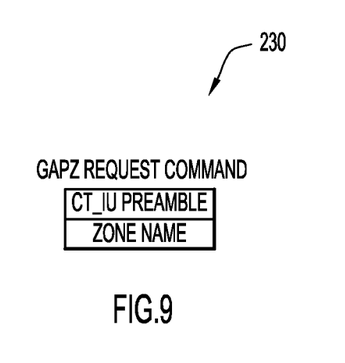
FIG. 9 is a table illustrating an example Get Active Peer Zone (GAPZ) request.
Figure 10:
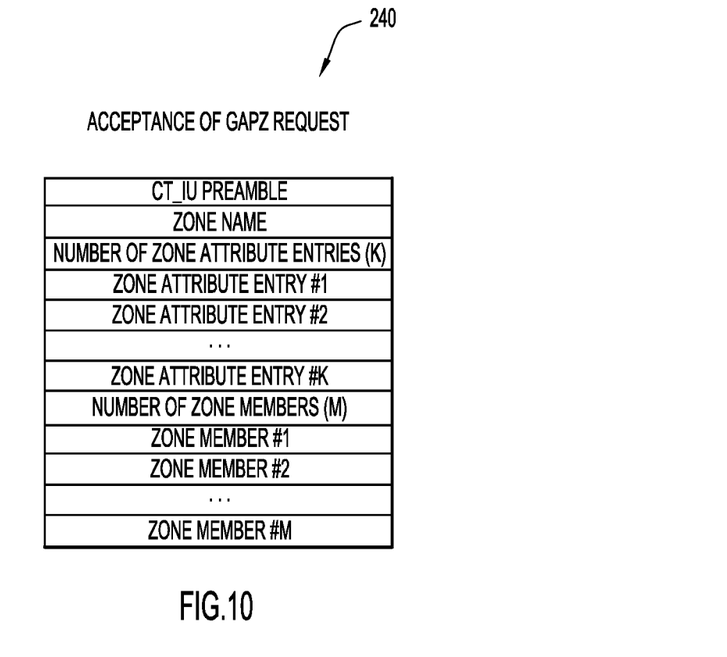
FIG. 10 is a table illustrating an example acceptance of the GAPZ request.

Table 230 of FIG. 9 shows the content of the GAPZ Request. As any Common Transport command, the first item is the CT_IU Preamble. The GAPZ Request also carries the name of the peer zone being queried. If the peer zone is in the active zone set, the Fabric Zone server responds with an acceptance of the GAPZ request. The content of an example acceptance is shown in table 240 of FIG. 10 (i.e., a zone definition). If the active zone set does not contain any peer zone having the specified zone name, then the GAPZ request is rejected.

The GAPZ command is an asynchronous command and does not require a Fabric lock (i.e., no Fabric lock operations are required for execution of the command).

Figure 11:
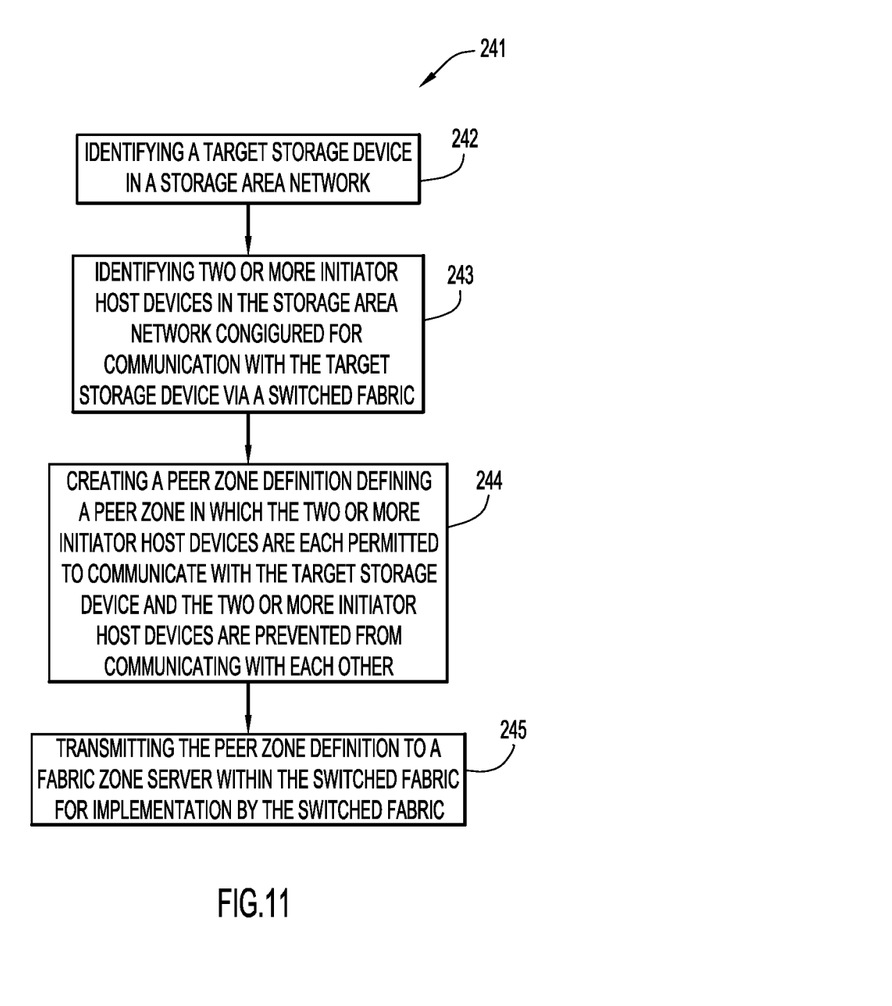
FIG. 11 is a high-level flowchart illustrating a method implemented in accordance with an example peer zoning technique.

FIG. 11 is a flowchart illustrating a method 241 that may be implemented in accordance with peer zoning techniques described herein. At 242, a target storage device in a storage area network is identified. At 243, two or more initiator host devices in the storage area network configured for communication with the target storage device via a switched fabric are identified. In certain circumstances, these devices may be identified based on selections received from an administrator (via a user interface of a management station) or from a storage device in the storage area network. In specific examples, a logical unit number (LUN) mask that identifies the target storage device and the two or more initiator host devices may be received.

At 244, a peer zone definition is created that defines a peer zone in which the two or more initiator host devices are each permitted to communicate with the target storage device and the two or more initiator host devices are prevented from communicating with each other. At 245, the peer zone definition is transmitted to the Fabric Zone Server within the switched fabric for implementation by the storage area network. It is to be understood that the processing of the received peer zone definition by the Fabric Zone Server includes distributing the peer zone definition to all of the switches in the switched fabric so that the Fabric Zone Server function in each switch receives the peer zone definition.

Figure 12:
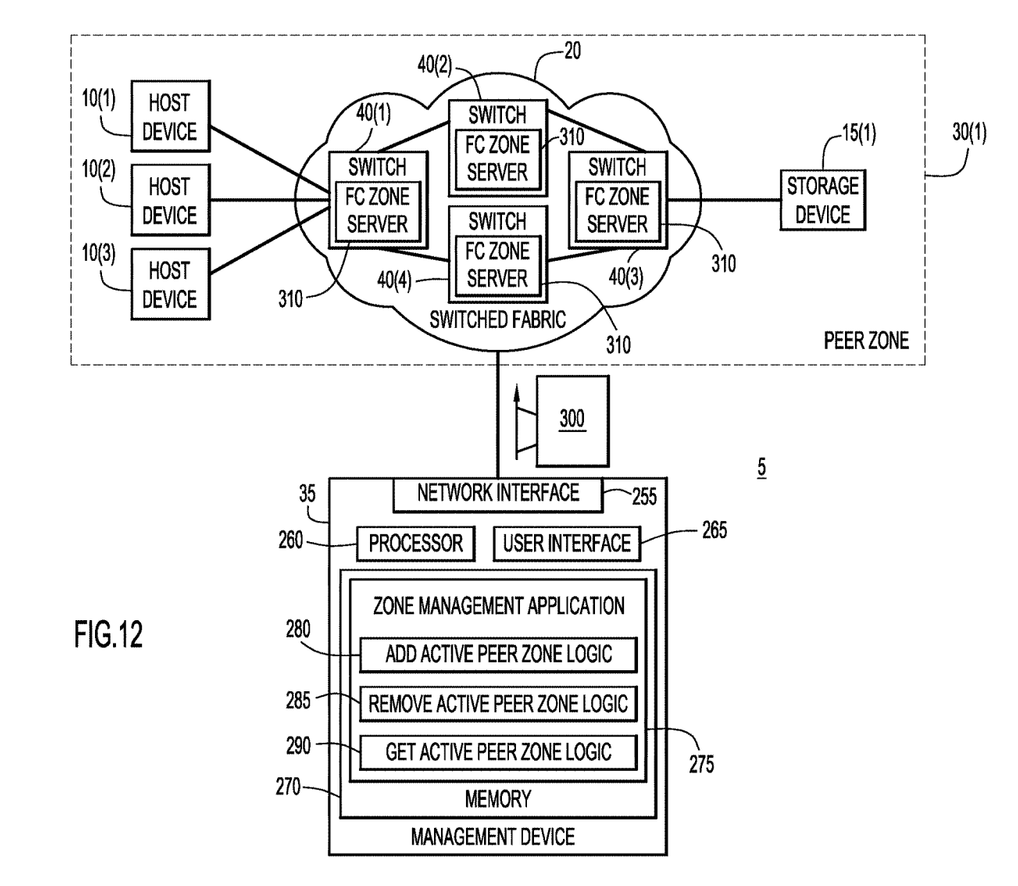
FIG. 12 is a block diagram illustrating the details of a management device configured to generate a peer zone definition in accordance with an example peer zoning technique.

FIG. 12 is a block of a portion of SAN 5 illustrating further details of switched fabric 20 and of management device 35 of FIG. 1. FC Fabric 20 comprises four switches 250(1)-250(4). Management device 35 comprises one or more network interfaces 255, a processor 260, a user interface 265, and a memory 270. Memory 270 includes a zone management application 275 that comprises, among other elements, Add Active Peer Zone (AAPZ) logic 280, Remove Active Peer Zone (RAPZ) logic 285, and Get Active Peer Zone (GAPZ) logic 290. For ease of illustration, only peer zone 30(1) is shown in FIG. 12.

As explained above, techniques described herein are generally directed to enhancing zoning in which a new zone, referred to as the peer zone, may be defined so that the two or more host devices are each permitted to communicate with a storage device, but the two or more initiator host devices are prevented from communicating with each other. FIG. 12 illustrates an example in which a peer zone definition, schematically illustrated by block 300, is created at management device 35 through execution of zone management application 275. More specifically, zone management application 275 includes three logical blocks referred to as AAPZ logic 280, RAPZ logic 285, and GAPZ logic 290. Each of these logical blocks performs various operations in response to information or commands received from an administrator or other user via user interface 265. AAPZ logic 280 is configured to create peer zone definition 300 defining peer zone 30(1) in which selected host devices 10(1)-10(3) are each permitted to communicate with a selected storage device 15(1), but the host devices are prevented from communicating with each other. The two or more host devices 10(1)-10(3), as well as storage device 15(1), may be selected by an administrator via user interface 265. Peer zone definition 300 is transmitted to an FC zone server 310 implemented, as described above, in FC Fabric.

The simplified interface (described above) includes the AAPZ, RAPZ, and GAPZ commands implemented through execution of AAPZ logic 280, RAPZ logic 285, and GAPZ logic 290, respectively. More specifically, AAPZ logic 280 allows for the creation or modification of peer zones (i.e., creating new peer zone definitions or replacing existing peer zone definitions). The RAPZ logic 285 allows management device 35 to remove one or more previously created peer zones (i.e., peer zones 30(1) or 30(2)) from the FC Fabric 20. Similarly, the GAPZ logic allows the querying of FC Fabric 20 for the definition of a specific peer zone currently implemented by the Fabric 5 (i.e., in the active Zone Set). In the example of FIG. 12, the GAPZ logic 290 would return, for example, the definition of peer zone 30(1).

In the example of FIG. 12, AAPZ logic 280, RAPZ logic 285, and GAPZ logic 290 are shown as one or more software modules stored in memory 270 that are executable by processor 260. To this end, memory 270 may comprise read only memory (ROM), random access memory (RAM), magnetic disk storage media devices, optical storage media devices, flash memory devices, electrical, optical, or other physical/tangible (non-transitory) memory storage devices. The processor 260 is, for example, a microprocessor or microcontroller that executes instructions for the AAPZ logic 280, RAPZ logic 285, and GAPZ logic 290. Thus, in general, the memory 270 may comprise one or more tangible computer readable storage media (e.g., a memory device) encoded with software comprising computer executable instructions and when the software is executed (by the processor 260) it is operable to perform the operations described herein in connection with the AAPZ, RAPZ, and GAPZ commands.

A peer zone is centered around a storage device. As such, it may be useful to enable a storage device to operate with FC Fabric 20 to create and push a peer zone definition into FC fabric 5. As noted above, this automatic provisioning is enabled through the AAPZ, RAPZ, and GAPZ commands which collectively provide a simplified interface (simplified relative to a conventional interface) for management of the peer zones. In such arrangements, there may not be a need for a dedicated management station and any device can manage the peer zones. In other words, in accordance with certain circumstances, a storage device (e.g., storage device 15(1) of FIG. 12) can define and manage its own peer zones through the AAPZ, RAPZ, and GAPZ commands (i.e., through execution of a zone management application, such as zone management application 275 shown in FIG. 12). Therefore, in accordance with the examples described herein, management device 35 may be a dedicated management station, or a storage device in SAN 5.

The above description is intended by way of example only.

What is claimed is:

1. A method comprising:
   identifying one or more target devices in a network;
   identifying a plurality of initiator host devices in the network configured for communication with the one or more target devices via a switched fabric;
   creating a peer zone definition for a peer zone associated with the network, wherein the peer zone definition comprises a peer member list and a peer zone attribute having a parameter indicating that the one or more target devices are principal members of the peer zone, and wherein the peer member list indicates that the plurality of initiator host devices are peer members within the peer zone that are each only allowed to communicate with the principal members of the peer zone and are not allowed to communicate with other devices within the peer member list; and
   transmitting the peer zone definition to a Fabric Zone Server within the switched fabric for enforcement of the peer zone by the switched fabric.

2. The method of claim 1, further comprising:
   creating a plurality of peer zone definitions each having an associated peer zone attribute identifying one or more principal members and a peer member list identifying a plurality of peer members of a respective peer zone; and
   transmitting the plurality of peer zone definitions to the Fabric Zone Server within the switched fabric.

3. The method of claim 1, further comprising:
   transmitting the peer zone definition to the Fabric Zone Server without performing a prior Fabric lock operation.

4. The method of claim 1, further comprising:
   removing the peer zone from the switched fabric.

5. The method of claim 1, further comprising:
    querying the switched fabric for the definition of one or more peer zones currently implemented by the switched fabric.

6. The method of claim 1, wherein creating the peer zone definition comprises:
    creating a peer zone definition at a management device connected to the network.

7. The method of claim 1, wherein creating the peer zone definition comprises:
    creating a peer zone definition at a storage device connected to a storage area network.

8. The method of claim 1, wherein identifying the one or more target devices and identifying the plurality of initiator host devices is in response to received device selections.

9. The method of claim 1, wherein the peer zone definition comprises a data structure that defines communications that are allowed and communications that are not allowed for a plurality of ports in a single fibre channel peer zone.

10. One or more non-transitory computer readable storage media encoded with software comprising computer executable instructions and when the software is executed operable to:
    identify one or more target devices in a network;
    identify a plurality of initiator host devices in the network configured for communication with the one or more target devices via a switched fabric;
    create a peer zone definition for a peer zone associated with the network, wherein the peer zone definition includes a peer member list and a peer zone attribute having a parameter indicating that the one or more target devices are principal members of the peer zone, and wherein the peer member list indicates that the plurality of initiator host devices are peer members within the peer zone that are each only allowed to communicate with the one or more principal members of the peer zone and are not allowed to communicate with other devices within the peer member list; and
    transmit the peer zone definition to a Fabric Zone Server within the switched fabric for enforcement of the peer zone by the switched fabric.

11. The non-transitory computer readable storage media of claim 10, further comprising instructions operable to:
    create a plurality of peer zone definitions each having an associated peer zone attribute identifying one or more principal members and a peer member list identifying a plurality of peer members of a respective peer zone; and
    transmit the plurality of peer zone definitions to the Fabric Zone Server within the switched fabric.

12. The non-transitory computer readable storage media of claim 10, further comprising instructions operable to:
    remove the peer zone from the switched fabric.

13. The non-transitory computer readable storage media of claim 10, further comprising instructions operable to:
    query the switched fabric for the definition of one or more peer zones currently implemented by the switched fabric.

14. The non-transitory computer readable storage media of claim 10, wherein the instructions operable to identify the one or more target devices and the instructions operable to identify the plurality of initiator host devices collectively comprise instructions operable to:
    receive a logical unit number (LUN) mask that includes the one or more target devices and the plurality of initiator host devices.

15. The non-transitory computer readable storage media of claim 10, wherein the peer zone definition comprises a data structure that defines communications that are allowed and communications that are not allowed for a plurality of ports in a single fibre channel peer zone.

16. An apparatus comprising:
    at least one network interface;
    a memory; and
    a processor coupled to the network interface and the memory, wherein the processor is configured to:
        identify one or more target devices in a network;
        identify a plurality of initiator host devices in the network configured for communication with the one or more target devices via a switched fabric;
        create a peer zone definition for a peer zone associated with the network, wherein the peer zone definition includes a peer member list and a peer zone attribute having a parameter indicating that the one or more target devices are principal members of the peer zone, and wherein the peer member list indicates that the plurality of initiator host devices are peer members within the peer zone that are each only allowed to communicate with the principal members of the peer zone and are not allowed to communicate with other devices within the peer member list; and
        transmit the peer zone definition to a Fabric Zone Server within the switched fabric for enforcement of the peer zone by the switched fabric.

17. The apparatus of claim 16, wherein the processor is further configured to create a plurality of peer zone definitions each having an associated peer zone attribute identifying one or more principal members and a peer member list identifying a plurality of peer members of a respective peer zone, and transmit the plurality of peer zone definitions to the Fabric Zone Server within the switched fabric.

18. The apparatus of claim 16, wherein the processor is further configured to remove the peer zone from the network.

19. The apparatus of claim 16 wherein the processor is further configured to query the switched fabric for the definition of one or more peer zones currently implemented by the switched fabric.

20. The apparatus of claim 16, wherein the apparatus is a storage device in a storage area network.

* * * * *